United States Patent [19]

Rohrer et al.

[11] Patent Number: 4,915,515
[45] Date of Patent: Apr. 10, 1990

[54] ROTATIONAL BEARING ARRANGEMENT FOR HIGH ROTATIONAL SPEEDS

[75] Inventors: Reinhard Rohrer; Henri Bürki, both of Biel; Jürg Bischofberger, Elsau; Raymond Frey, Zurich, all of Switzerland

[73] Assignee: Maschinenfabrik Rieter AG, Winterthur, Switzerland

[21] Appl. No.: 192,073

[22] Filed: May 9, 1988

[30] Foreign Application Priority Data

May 8, 1987 [CH] Switzerland ............... 01767/87

[51] Int. Cl.$^4$ .................................. F16C 33/46
[52] U.S. Cl. ............................ 384/465; 384/470; 384/472
[58] Field of Search ........... 384/465, 470, 512, 472, 384/489, 523

[56] References Cited

U.S. PATENT DOCUMENTS

| 2,271,820 | 2/1942 | Hamilton . | |
|---|---|---|---|
| 2,332,747 | 10/1943 | Onsrud . | |
| 4,365,851 | 12/1982 | Andres et al. | 384/470 |
| 4,400,040 | 8/1983 | Toth et al. | 384/465 |
| 4,704,039 | 11/1987 | Ide | 384/465 |

FOREIGN PATENT DOCUMENTS

| 0012447 | 6/1980 | European Pat. Off. . |
|---|---|---|
| 0081281 | 6/1983 | European Pat. Off. . |
| 1067642 | 10/1959 | Fed. Rep. of Germany . |
| 3540252 | 6/1986 | Fed. Rep. of Germany . |
| 1024497 | 4/1953 | France . |
| 561367 | 4/1975 | Switzerland . |
| 936213 | 9/1963 | United Kingdom . |
| 2166813 | 5/1986 | United Kingdom . |

Primary Examiner—Lenard A. Footland
Attorney, Agent, or Firm—Werner W. Kleeman

[57] ABSTRACT

The horizontally mounted rotational bearing arrangement for high speeds of rotation is mounted in a casing in two radial rolling bearings. Each radial rolling bearing comprises rolling members guided by an associated cage, and further comprises a groove provided at the shaft and operative as an inner race, as well as an outer race. A respective slinger ring is disposed between each radial rolling bearing and associated cover plate. An impingement surface extends around the associated slinger ring and is in alignment with an operative edge of such slinger ring. This impingement surface is effective for returning lubricant to the rolling members of the associated radial rolling bearing. The cage of each radial rolling bearing is constructed such that by virtue of its movement in operation, the lubricant is conveyed to the rolling members of the associated radial rolling bearing. The rotational bearing arrangement has the advantages of substantially obviating the entry of dirt into the interior of the rotational bearing arrangement and, more particularly, egress of lubricant therefrom.

10 Claims, 3 Drawing Sheets

ROTATIONAL BEARING ARRANGEMENT FOR HIGH ROTATIONAL SPEEDS

CROSS-REFERENCE TO RELATED APPLICATION

This application is related to the commonly assigned, copending U.S. application Ser. No. 192040, filed on May 9, 1988, and entitled "ROTATIONAL BEARING ARRANGEMENT FOR HIGH SPEEDS OF ROTATION".

BACKGROUND OF THE INVENTION

The present invention relates to a new and improved construction of a rotational or rotary bearing or bearing arrangement for high rotational speeds.

In its more specific aspects, the present invention relates to a new and improved construction of a rotational bearing or bearing arrangement for high speeds of rotation and, in the mounted state or condition thereof, comprises a substantially horizontally arranged rotational bearing arrangement. The rotational bearing arrangement comprises a rotatable shaft which is rotatable in a casing or housing about an axis of rotation or rotational axis. The rotatable shaft is mounted in two radial rolling bearings. Each of the radial rolling bearings comprises rolling members or bodies guided by an associated cage and an associated groove provided at the shaft. At each end or end region of the casing or housing, there is mounted a respective cover member or cover plate. Between the two radial rolling bearings, there is provided internally of the casing or housing, a lubricant supply.

German patent No. 3,540,252, published June 5, 1986, and Swiss patent No. 561,367, granted Mar. 15, 1975, disclose outer cover plates for preventing dirt and foreign bodies from entering the interior of the rotational bearing and for preventing the egress of lubricant therefrom. Unfortunately, the known arrangements have the disadvantage that lubricant losses, more particularly in operation, are still considerable.

SUMMARY OF THE INVENTION

Therefore, with the foregoing in mind, it is a primary object of the present invention to provide a new and improved construction of a rotational bearing or bearing arrangement for high rotational speeds which is not afflicted with the aforementioned drawbacks and shortcomings of the prior art constructions.

Another and more specific object of the present invention is directed to a new and improved construction of a rotational bearing or bearing arrangement for high rotational speeds wherein facilities are provided so that lubricant which spatters or sprays-off the radial rolling bearings in operation does not reach the cover plates but is intercepted by the slinger rings before it can do so and is advantageously then returned to the cages and rolling members of the radial rolling bearings.

In keeping with the immediately preceding object, it is a further noteworthy object of the present invention to provide a new and improved construction of a rotational bearing arrangement which is designed such that virtually no lubricant reaches the cover plates or cover members when the rotational bearing arrangement is in operation and lubricant losses during operation are substantially zero.

Yet a further significant object of the present invention aims at providing a new and improved construction of a rotational bearing arrangement for high rotational speeds of a rotating member, typically a shaft, and which is relatively simple in construction and design, quite economical to manufacture, highly reliable in operation, not readily subject to breakdown or malfunction and requires a minimum of maintenance and servicing.

Now in order to implement these and still further objects of the invention, which will become more readily apparent as the description proceeds, the rotational bearing arrangement for high rotational speeds is manifested by the features that there is provided for each radial rolling bearing, a slinger ring or ring member for the lubricant. Each such slinger ring or ring member has an operative or active edge and is mounted at the shaft. Each such slinger ring or ring member is disposed between the associated rolling members of the related or associated radial rolling bearing and the associated cover plate. An impingement surface which concentrically encircles the operative or active edge of the associated slinger ring is constructed such that the impingement surface forms a lubricant return back to the associated rolling members for lubricant impinging at each such slinger ring. The cage of each radial rolling bearing is constructed in such a manner that in operation, the cage, by virtue of its movement, causes lubricant feed or conveyance to the rolling members of the associated radial rolling bearing.

As already noted heretofore, by virtue of the inventive construction of the rotational bearing arrangement, lubricant which spatters or sprays-off the rolling bearings in operation does not reach the cover plates or cover members but is intercepted by the lubricant slinger rings before it can do so and is advantageously then returned to the cages and rolling members. As a result, virtually no lubricant reaches the cover plates or cover members when the rotational bearing arrangement is in operation and lubricant losses in operation practically do not occur.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Figure 1:
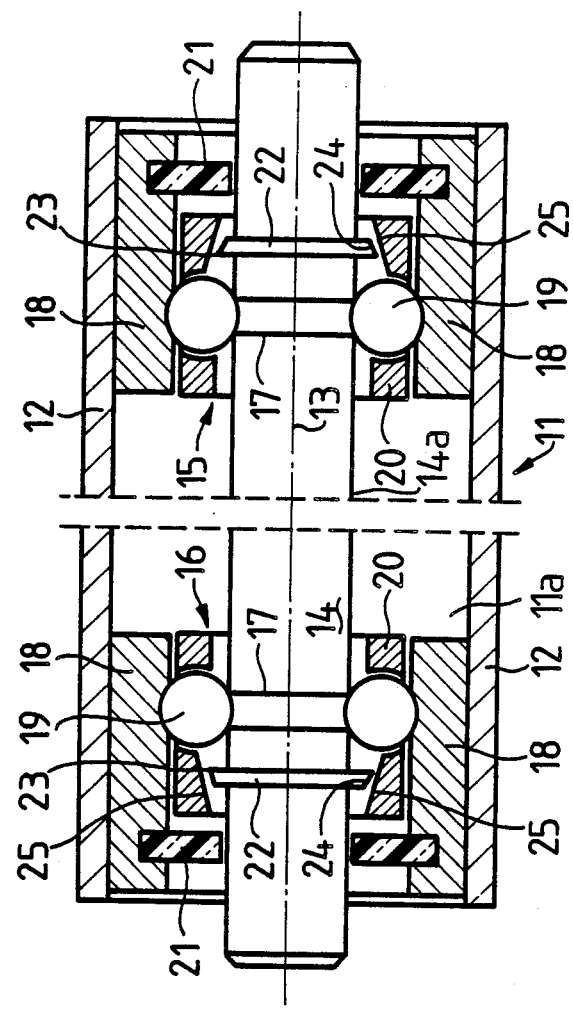
FIG. 1 is a longitudinal section through a first exemplary embodiment of rotational bearing arrangement constructed according to the present invention.

Describing now the drawings, it is to be understood that to simplify the showing thereof, only enough of the structure of the rotational bearing or bearing arrangement for high rotational speeds has been illustrated therein as is needed to enable one skilled in the art to readily understand the underlying principles and concepts of the present invention. Turning now specifically to FIG. 1 of the drawings, the rotational bearing arrangement 11 for high rotational speeds illustrated therein by way of example and not limitation, will be seen to comprise a casing or housing 12 in which there is mounted a rotatable shaft or shaft member 14 so as to be rotatable around a rotational axis or axis of rotation 13. To that end, the shaft or shaft member 14 is mounted in two radial rolling bearings 15 and 16 of the rotational bearing arrangement 11. Each radial rolling bearing 15 and 16 comprises a groove or groove member or track 17 formed at the shaft or shaft member 14 and which is operative or serves as the bearing inner race, a stationary outer race 18 rigidly secured in any suitable fashion to the casing 12, rolling members, here shown, for instance, in the form of balls 19 or equivalent rolling members, and a rotatable cage or cage member 20 for guiding the balls 19 or equivalent rolling members or bodies.

Cover plates or cover members 21 are provided outside or externally of each radial rolling bearing 15 and 16 as considered in axial direction, that is to say, in the direction of the rotational axis 13 of the shaft 14. These cover plates 21 or equivalent cover structure, are appropriately rigidly secured in any desired fashion in the stationary outer races 18 and accurately adapted to the outer surface 14a of the shaft or shaft member 14 to ensure optimal sealing tightness with respect to the employed lubricant, oil, for instance. The cover plates 21 act as seals in relation to the exterior of the rolling bearing arrangement 11 in order to prevent dirt or other contaminants from entering the interior of such rotational bearing arrangement 11 and to prevent lubricant from issuing or escaping to the outside. Slinger or splash rings or ring members 22 are mounted on, and rigidly secured to, the rotatable shaft or shaft member 14. When this shaft or shaft member 14 rotates, lubricant reaching the slinger rings 22, which may be constituted by annular discs, is hurled or propelled away from the edge or edge region located furthest away from the rotational axis 13, that is, from the operative or active edge 23. To form such an operative or active edge or edge region 23, the lubricant slinger ring 22 advantageously is substantially frustum-shaped, i.e. has an outer or jacket surface 24, i.e. a surface substantially conically divering in a direction towards the associated radial roller bearing.

When the rotational bearing arrangement 11 is in operation, that is to say, when the shaft or shaft member 14 rotates, the lubricant, for example as stated, oil, which is present in the interior of the rotational bearing arrangement 11 and which lubricant is not shown, is moved intensively and is sprayed, among other things, towards the center or central region of the rotational bearing arrangement 11, although this spraying action is negligible as far as the herein disclosed constructions of the rotational bearing arrangements is concerned. The main consideration concerns the oil which sprays axially outwards from the grooves or tracks 17 and balls 19. Such oil drops on the lubricant slinger rings 22 and associated impingement surface 25. Due to the rotation of each slinger ring 22, the oil impinging thereon flows to the operative or active edge 23 and is thus propelled by such operative or active edge 23 onto the associated impingement surface 25. In the present example and as shown in FIG. 1, the impingement surface 25 is defined by the surface of the part of the associated cage or cage member 20 which is disposed axially outwards of the related balls or ball members 19. Since each such impingement surface 25 has an open form or shape which widens conically towards the interior of the rotational bearing arrangement 11 in the axial direction and since the oil tends to adhere to each such impingement surface 25 and because of the centrifugal forces arising from rotation of these impingement surfaces 25, the oil impacting against each impingement surface 25 is returned to the related or associated balls or ball members 19. Each such impingement surface 25 is therefore effective as an oil return or an oil return flow expedient.

If, as is the case in known arrangements or systems, there were no slinger rings 22, a relatively large quantity of oil would flow to the cover plates 21. Since the seal between the cover plates 21 and the shaft 14 is always imperfect and thus allows a certain oil throughflow, there would always be some loss of oil in the absence of the slinger rings 22. The slinger rings 22 render it virtually impossible for the oil to reach the cover plates 21.

When the rotational bearing arrangement 11 is stationary, the oil collects in its bottom part, generally indicated in FIG. 1 by reference character 11a and forms a so-called "sump". If the top or boundry limit of the sump is below the lowest part of the shaft 14, oil losses with the device stationary are completely obviated. The reason for this is that nothing can issue or escape between each cover plate 21 and the shaft 14 since the place or location where each cover plate 21 is secured to the associated outer race 18 can be made absolutely sealing-tight or leak-proof. Consequently, if a rotational bearing or bearing arrangement 11 is to be sealing-tight or leak-proof in its inoperative state, it must be mounted substantially horizontally.

The rotational bearing arrangement 11 heats-up in operation. If the lubricant used is grease instead of oil, the grease becomes liquid and so the comments hereinbefore given are effective for greases as well as for oil.

Figure 2:
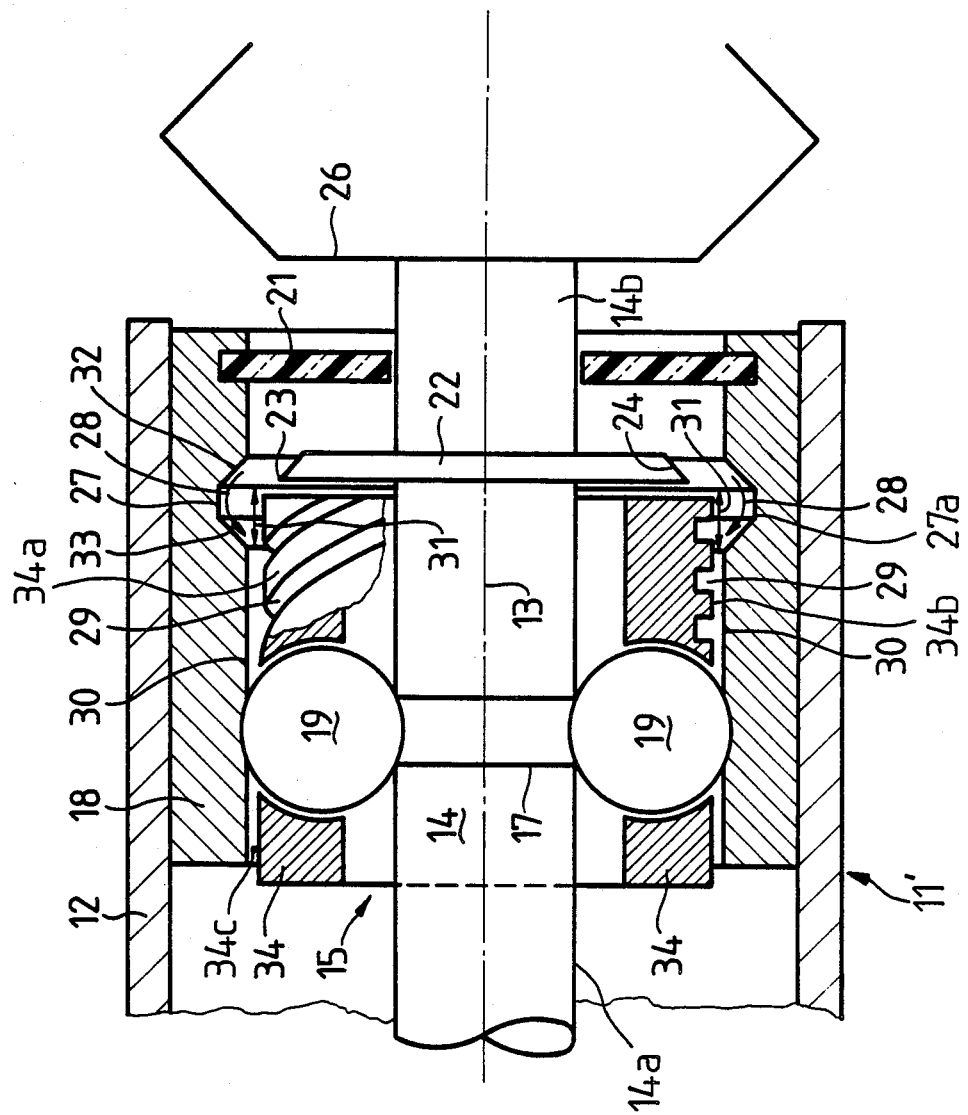
FIG. 2 is a longitudinal section through a second exemplary embodiment of rotational bearing arrangement constructed according to the present invention and depicting one end region thereof, it being noted that the non-illustrated opposite end region is essentially identically constructed.

FIG. 2 shows one end or end region of a second embodiment of a rotational bearing or bearing arrangement 11', the opposite non-depicted end region being essentially identically constructed. The rotational bearing arrangement 11' has a casing or housing 12 and a rotatable shaft or shaft member 14 which is rotatable around a rotational axis or axis of rotation 13 and in which one of the grooves or tracks 17 in the shaft or shaft member 14 is visible. The depicted groove 17 forms the inner race of a radial rolling bearing 15 which also has an outer race 18 and rolling members 19. These rolling members 19 are guided in a cage or cage member 34 and are here shown in the form of balls 19. As in the previous embodiment, a cover plate or cover member 21 prevents dirt or other contaminants from entering the interior of the rotational bearing arrangement 11' and prevents lubricant from escaping from the interior thereof. A rotor or rotor member 26 which rotates at high speed when the rotational bearing arrangement is used for open-end spinning is secured to one end 14b of the shaft 14. As in the previous embodiment, a lubricant slinger or splash ring 22 is disposed on the shaft 14.

Also present is a deflecting or deflection groove 27 which is stationary in operation. The function of the deflecting groove or groove means 27 is to deflect lubricant departing from the slinger ring 22 in the direction indicated by the arrows 28. The deflecting groove 27 has a shape narrowing towards its base 27a and therefore has two inclined side walls 32 and 33. In the example shown, the deflecting groove 27 is formed or provided in the outer race 18. The inclined side wall 32 of the deflecting groove 27 and which is situated remote from the associated radial rolling bearing 15, is substantially in alignment with the operative or active edge 23 of the associated slinger ring 22. The deflecting groove 27 is operative as a return or return flow expedient for the lubricant to the balls 19.

In its side or surface 34a remote from the shaft 14 and in its region 34b disposed axially outwards of the rolling members, here the balls 19, the cage 34 is formed with grooves or groove means 29 which extend helically towards the related balls 19. A covering surface 30 formed by the associated outer race 18, is disposed at a small distance or spacing from the complete area or surface located immediately above the grooves 29. The covering or cover surface 30 covers the cage region which is adjacent the balls 19 and outside the balls 19 except for the region which is furthest away from the balls 19 and which extends over the axial distance or zone 31. The inclined groove side wall 33 which is radially near, or situated closer to, the balls 19, is disposed above the last-mentioned region defined by the axial distance or zone 31.

When a rotational bearing or bearing arrangement 11' of the type shown in FIG. 2 is in operation, the lubricant, such as oil, inside such rotational bearing arrangement 11' experiences intensive movement. More particularly, the oil spraying outwardly of the balls 19 must, in the conventional devices, be retained by the associated cover plate 21, something which, as previously stated, is not achieved satisfactorily since the sliding or rubbing engagement between the cover plate 21 and the shaft 14 cannot be perfectly sealing-tight. In contrast, however, the lubricant slinger ring 22, since it co-rotates with the rotatable shaft 14, can be assembled in completely sealing-tight manner so that in the embodiment of FIG. 2 according to the invention, all the oil moving axially outwards is intercepted by the slinger ring 22. The slinger ring 22 hurls or propels such oil towards the associated deflecting groove or groove means 27 which deflects the oil as generally indicated by the arrows 28. For such oil deflection to occur, the groove side wall 32 situated remote from the radial rolling bearing 15 must be substantially in alignment with the operative or active edge 23 of the associated slinger ring 22. In the embodiment shown, the groove side wall 32 widens or outwardly tapers conically towards the center or central region of the rotational bearing arrangement 11' in the axial direction.

The other groove side wall 33 has a shape which narrows or inwardly tapers conically towards the center or central region of the rotational bearing arrangement 11'. The groove side wall 33 is in registration or alignment with the cage region which is formed with grooves 29, is furthest away from the balls 19 and is not covered by the covering surface 30. Oil dropping-off the groove side wall 33 therefore drops onto the region of the cage 20 which is not covered by the covering surface 30 and located furthest from the balls 19. The cage 34 rotates around the lengthwise axis 13. As can be gathered from that part of the cage 34 which is in the top right-hand portion of FIG. 2 and which is shown in elevation, the grooves 29 extend in this part of the cage 34 inclinedly from front to rear towards the balls 19. Assuming that the cage 34 rotates in a direction such that the grooves 29 visible in the partial view of FIG. 2, move from front to rear for the observer of FIG. 2, the oil dripping at this place or location over the axial zone or distance 31 enters the grooves 29 and moves towards the balls 19 due to the rotation of the cage 34. The distance between the outer or jacket surface of the cage 34 and the covering or cover surface 30 and which forms a narrow gap 34c, is exaggerated in FIG. 2 and is very small in practice, amounting to, for instance, 0.05 to 0.5 mm. Consequently, oil is conveyed continuously by the grooves 29 to the balls 19 after the fashion of a screw pump. More particularly, as a result of this narrow gap 34c, no oil can flow outwardly between the outer or jacket surface of the cage 34 and the covering or cover surface 30, and since interception of the oil by the lubricant slinger ring 22 is substantially complete, the rotational bearing arrangement 11' according to the invention as shown in FIG. 2, provides a substantially oil-tight closure.

Figure 3:
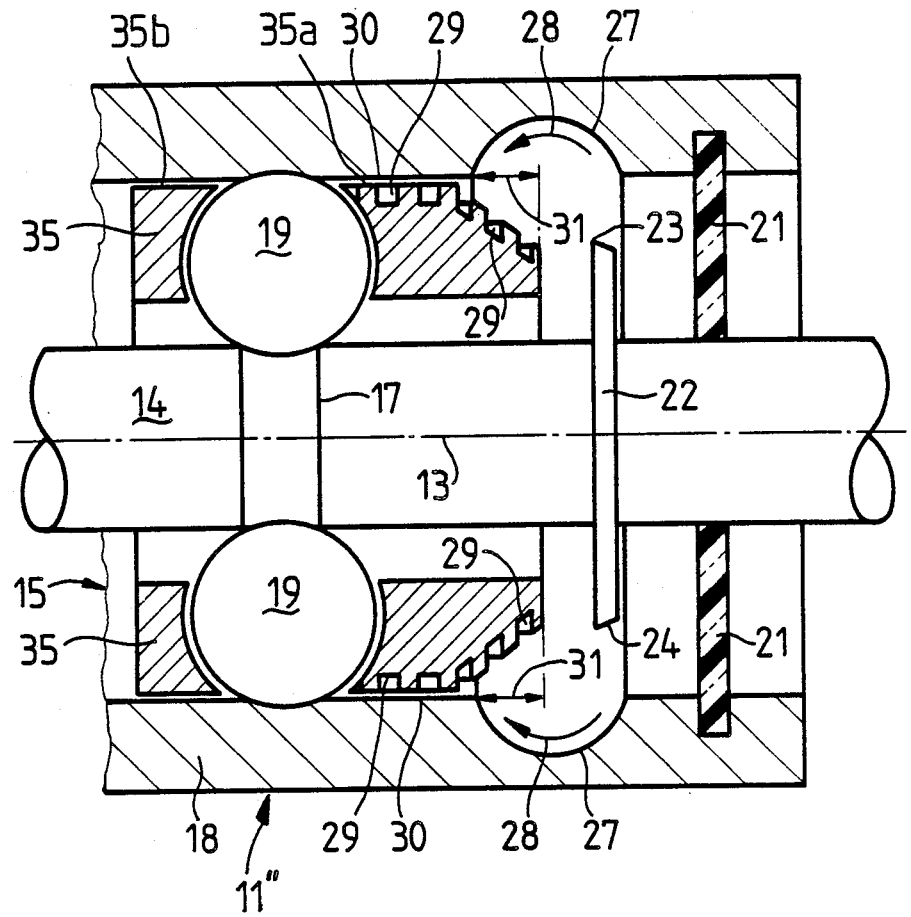
FIG. 3 is a longitudinal section through a third exemplary embodiment of rotational bearing arrangement constructed according to the present invention and again depicting one end region thereof, it likewise being noted that the non-illustrated opposite end region is essentially identically constructed.

FIG. 3 illustrates a rotational bearing arrangement 11" differing from the embodiment of FIG. 2, again conveniently depicting for the sake of convenience in the drawing illustration one end region thereof, wherein the opposite non-depicted end region is essentially identically constructed. The rotational bearing arrangement 11" of FIG. 3 has a rotatable shaft or shaft member 14 rotatable about a rotational axis or axis of rotation 13. A rolling bearing 15 for the shaft 14, such rolling bearing 15 being shown disposed at the right-hand end of the rotational bearing arrangement 11", is in the form of a radial rolling bearing. Rolling members or bodies in the form of balls 19 are guided by a groove or track 17 and a stationary outer race 18. A cover plate or cover member 21 is operative to prevent the entry of external foreign bodies or contaminants and the egress of lubricant. A lubricant slinger or splash ring 22 having an operative or active edge 23 is rigidly secured to the rotatable shaft 14. The outer race 18 of the radial rolling bearing 15 is formed with a deflecting or deflection groove 27 operative to return lubricant to the balls 19, the deflecting groove 27 deflecting lubricant hurled-off or propelled from the slinger ring 22 in the direction indicated by the arrows 28. The outer or jacket surface 35a of a cage or cage member 35 is formed with grooves or groove means 29 which extend helically towards the balls 19. A covering surface 30 is provided at a reduced or small distance from the grooves 29 to cover the latter.

In contrast to the embodiment of FIG. 2, in FIG. 3, the cage region which is furthest away from the balls 19, not covered by the covering surface 30 and disposed above the axial zone or region 31, narrows conically in the axial direction.

To explain the operation of this construction, it will again be assumed that, referring to the top half of FIG. 3, the grooves 29 extend helically to the rear towards the balls 19 and, as they rotate, move towards the viewer. Consequently, oil dropping-off the stationary deflecting groove 27 into the rotating grooves 29 is moved inwardly by the grooves 29 until the oil has reached the full speed of rotation. In its movement, such oil, in turn, moves oil already present in the grooves 29 further towards the balls 19. This operation corresponds to the operation occurring in the example shown in FIG. 2. A further feature is that because of the conical shape of the cage or cage member 35, the grooves 29 rise towards the balls 19, that is to say, the distance between the grooves 29 and the rotational or lengthwise axis 13 increases. Since the oil tends to adhere to the grooves 29 by capillary action, such oil is also urged outwards, and therefore along the grooves 29 towards the balls 19, by the centrifugal forces arising from rotation of the cage or cage member 35. Since the gap 35b between the grooves 29 and the covering or cover surface 30 is very small, again for instance, in the aforenoted range of 0.05 to 0.5 mm, the oil entering the groove zones below the covering or cover surface 30 cannot issue therefrom and is therefore urged towards the balls 19.

While there are shown and described present preferred embodiments of the invention, it is to be distinctly understood that the invention is not limited thereto, but may be otherwise variously embodied and practiced within the scope of the following claims.

ACCORDINGLY,

What we claim is:

1. A rotational bearing arrangement for high speeds of rotation and disposed substantially horizontally when in assembled state, comprising:
    a casing having oppositely situated ends;
    a shaft having a rotational axis;
    two radial rolling bearings for mounting said shaft in said casing for rotation around said rotational axis;
    each of said two radial rolling bearings comprising rolling members, a rotatable cage and a groove provided in said shaft;
    said rolling members of each radial rolling bearing being guided in an associated rotatable cage and groove of the shaft;
    a respective cover plate provided at each end of the oppositely situated ends of said casing;
    a respective lubricant slinger ring coacting with an associated one of said radial rolling bearings and mounted on said shaft;
    each said lubricant slinger ring having an operative edge disposed between said rolling members and said cover plate of the associated radial rolling bearing;
    a respective impingement surface cooperating with the lubricant slinger ring of each radial rolling bearing for returning to said rolling members of the associated radial rolling bearing lubricant propelled from the operative edge of said associated lubricant slinger ring to the respective impingement surface;
    said impingement surface extending concentrically around said cooperative edge of the associated lubricant slinger ring; and
    each said rotatable cage being structured such that during operation of the rotational bearing arrangement each said rotatable cage conveys lubricant to the associated rolling members during rotation of the rotatable cage.

2. The rotational bearing arrangement as defined in claim 1, wherein:
    each said impingement surface, which concentrically extends around the lubricant slinger ring is provided at the associated rotatable cage;
    each said rotatable cage having a side situated near the associated lubricant slinger ring and extending to said rolling members of the associated radial rolling bearing; and
    each said impingement surface widening substantially conically in axial direction towards said rolling members of the associated radial rolling bearing.

3. The rotational bearing arrangement as defined in claim 1, wherein:
    each said impingement surface comprises deflecting groove means;
    each said deflecting groove means having a base and inclined groove side walls;
    each said deflecting groove means being arranged coaxially with respect to the operative edge of the associated lubricant slinger ring and being open in the direction of the associated lubricant slinger ring;
    each said deflecting groove means narrowing in the direction of said base;
    one of said inclined groove side walls being situated further from the associated radial rolling bearing and the other of said inclined side walls being situated nearer to the associated radial rolling bearing;
    said one inclined groove side wall being substantially in alignment with the operative edge of the associated lubricant slinger ring; and
    said other inclined groove side wall extending around the rotatable cage of the associated radial rolling bearing and forming a return for lubricant to said rotatable cage of the associated radial rolling bearing.

4. The rotational bearing arrangement as defined in claim 1, wherein:
    each said rotatable cage has a side located remote from said shaft;
    each said rotatable cage has a region disposed axially outside the rolling members of the associated radial rolling bearing;
    each said region of each said rotatable cage being provided with groove means which extend helically towards the rolling members of the associated radial rolling bearing; and
    a covering surface extending directly above each said region of each said rotatable cage at a predeterminate small spacing therefrom except for a part of the rotatable cage situated furthest away axially from the rolling members of the associated radial rolling bearing.

5. The rotational bearing arrangement as defined in claim 4, wherein:
    each said radial rolling bearing has an outer race; and
    said deflecting groove means and said covering surface which is disposed immediately above said groove means of each said radial rolling bearing are formed by the outer race of said radial rolling bearing.

6. The rotational bearing arrangement as defined in claim 4, wherein:
    said part of the rotatable cage situated furthest away axially from the rolling members of the associated radial rolling bearing and not covered by said covering surface narrows conically outwards axially of the rotational bearing arrangement.

7. The rotational bearing arrangement as defined in claim 1, wherein:
    each said lubricant slinger ring comprises an annular disc having an outer surface which substantially conically diverges in a direction towards the associated roller bearing.

8. The rotational bearing arrangement as defined in claim 1, wherein:

said lubricant slinger ring possesses an outer surface which is conically divergent in a direction towards the rolling members of the radial roller bearing to provide for progressively increasing centrifugal force in said direction.

9. The rotational bearing arrangement as defined in claim 1, wherein:

said impingement surface possesses a configuration which is at least in part divergent in a direction towards the rolling members of the radial roller bearing to provide for progressively increasing centrifugal force in said direction.

10. A rotational bearing arrangement for high speeds of rotation, comprising:

a casing having an end region;

a shaft having a rotational axis;

at least one rolling bearing for mounting said shaft in said casing for rotation around said rotational axis;

said rolling bearing comprising rolling members, a rotatable cage and a groove provided in said shaft;

said rolling members of said rolling bearing being guided in the rotatable cage and groove of the shaft;

a cover plate provided at the end region of said casing;

a lubricant slinger means coacting with said rolling bearing and mounted on said shaft;

an impingement surface cooperating with said lubricant slinger means for returning to said rolling members of the rolling bearing lubricant propelled from said lubricant slinger means to said impingement surface;

said lubricant slinger means having an operative edge disposed between said rolling members and said cover plate of the rolling bearing;

said impingement surface extending concentrically around said operative edge of the lubricant slinger means; and said rotatable cage, during operation of the rotational bearing arrangement, conveying lubricant to the rolling members during rotation of the rotatable cage.

* * * * *